United States Patent
Wald et al.

(10) Patent No.: US 11,613,197 B1
(45) Date of Patent: Mar. 28, 2023

(54) FOLDING TRAILER RAMP WITH POWERED FULL EXTENSION AND SOFT GROUND CONTACT

(71) Applicant: Felling Trailers, Inc., Sauk Centre, MN (US)

(72) Inventors: Kyle M. Wald, Litchfield, MN (US); Curtis E. Tagtow, Atwater, MN (US); Catherine M. Voge, Bertina, MN (US)

(*) Notice: Subject to any disclaimer, the term of this patent is extended or adjusted under 35 U.S.C. 154(b) by 112 days.

(21) Appl. No.: 17/169,361

(22) Filed: Feb. 5, 2021

Related U.S. Application Data (60) Provisional application No. 62/970,673, filed on Feb. 5, 2020.

(51) Int. Cl.
*B60P 1/43* (2006.01)

(52) U.S. Cl.
CPC ................................. *B60P 1/435* (2013.01)

(58) Field of Classification Search
CPC .. B60P 1/43; B60P 1/431; B60P 1/435; B62D 33/03
USPC .................... 296/57.1, 61; 414/537, 556, 557
See application file for complete search history.

(56) References Cited

U.S. PATENT DOCUMENTS

| | | | |
|---|---|---|---|
| 2,593,240 A * | 4/1952 | Anthony | B60P 1/4414 296/57.1 |
| 2,721,758 A | 10/1955 | Allen | |
| 2,727,781 A | 12/1955 | D'Eath | |
| 3,142,394 A * | 7/1964 | Norman | B60P 1/433 414/537 |
| 3,580,404 A | 5/1971 | Moser | |
| 3,642,156 A | 2/1972 | Stenson | |
| 3,842,997 A * | 10/1974 | Sprikkelman | B60P 1/4414 414/557 |
| 3,889,827 A * | 6/1975 | Fine | B60P 1/4407 296/61 |
| 4,305,694 A * | 12/1981 | Chan | B60P 1/433 293/118 |
| 4,647,270 A | 3/1987 | Maloney | |

(Continued)

FOREIGN PATENT DOCUMENTS

| | | | | |
|---|---|---|---|---|
| DE | 202014009765 U1 * | 4/2015 | | B60P 1/43 |
| EP | 1256485 A1 * | 11/2002 | | B60P 1/16 |

OTHER PUBLICATIONS

English Translation of DE 2014009765.*

*Primary Examiner* — D Glenn Dayoan
*Assistant Examiner* — Kevin P Weldon
(74) *Attorney, Agent, or Firm* — Albert W. Watkins (57) ABSTRACT

A folding trailer ramp suitable for heavy machinery has powered full extension and soft ground contact. A prime mover such as an air bag and actuator assembly rotates one link of a quadrilateral linkage. When deploying the folding ramp, the quadrilateral linkage fully extends a ramp tip from a main ramp segment before the ramp tip touches down onto the ground. The ramp tip locks into a stable position when fully extended. A push rod that forms a second link of the quadrilateral linkage is in some embodiments adjustable in length, and in further embodiments includes a spring pack that only changes length after the ramp tip is fully extended and locked into a stable position. A pivot arm that forms another link may terminate at an anti-friction roller that presses against and thereby locks the ramp tip. A roller channel may also partially encompass and protect the anti-friction roller.

19 Claims, 9 Drawing Sheets

(56) References Cited

U.S. PATENT DOCUMENTS

| | | | |
|---|---|---|---|
| 5,215,426 A * | 6/1993 | Bills, Jr. | B60P 1/43 |
| | | | 414/537 |
| 6,386,819 B1 | 5/2002 | Schultz | |
| 6,394,734 B1 | 5/2002 | Landoll et al. | |
| 7,547,178 B1 | 6/2009 | Dierks et al. | |
| 7,658,587 B1 | 2/2010 | Dierks et al. | |
| 8,132,998 B2 | 3/2012 | Paproski | |
| 9,315,138 B1 | 4/2016 | Dierks et al. | |
| 9,656,588 B2 | 5/2017 | Robertson | |
| 10,486,577 B1 * | 11/2019 | Geraets | B60P 1/433 |
| 2016/0096464 A1 * | 4/2016 | Robertson | B60P 3/06 |
| | | | 414/480 |
| 2016/0137117 A1 * | 5/2016 | Parrish | B60P 1/435 |
| | | | 414/537 |

\* cited by examiner

FOLDING TRAILER RAMP WITH POWERED FULL EXTENSION AND SOFT GROUND CONTACT

CROSS REFERENCE TO RELATED APPLICATIONS

The present application claims the benefit of U.S. provisional patent application 62/970,673 filed Feb. 5, 2020 of like title and inventorship, the teachings and entire contents which are incorporated herein by reference.

BACKGROUND OF THE INVENTION

1. Field of the Invention

The present invention pertains generally to land vehicles having a folding loading ramp, and more particularly to a powered folding loading ramp having soft ground contact. In a most particular manifestation, the present invention pertains to loading ramps adequate to support heavy equipment, including for exemplary and non-limiting purpose bulldozers, skid-steers, tractors, trucks, and other wheeled and tracked implements such as are commonly used in construction, agriculture, and other industries.

2. Description of the Related Art

Heavy machinery is invaluable in many industries, vastly improving both economies of scale and also providing capabilities that cannot be reasonably accomplished in any other way. As a result, many trades and industries rely upon these machines. Nevertheless, for many of the applications the heavy machine is required only once, or otherwise infrequently, at any given location. Owing to the high initial cost of such machinery, there are relatively few instances where a machine is purchased solely for one job location. Instead, heavy machinery is frequently transported upon a trailer or truck bed from one job location to the next. Even in those relatively fewer instances where such machinery is used at one location on a regular basis, there will be occasions where the machinery must be transported from the location. For example, the machinery may require maintenance and servicing by a dealer or repair shop.

As may be appreciated, the extreme weight of heavy machinery demands a loading ramp of great strength. Such strength results in the ramp being quite heavy, and so the manipulation of the ramp is most commonly controlled through operation of hydraulic actuators.

The heavy machinery will also be required to ascend or descend what is most desirably a very gentle incline during loading and unloading, respectively. To keep the incline small requires a relatively longer ramp. In consideration of the increased length, it is undesirable to extend a long and heavy ramp entirely vertically when not in use, due to: legal height limitations of various jurisdictions; practical height limitations to pass through garage and storage building doors and the like; the substantial wind resistance of the vertical ramp during travel; and also owing to the substantial forces created by the long loading ramp extending far from the trailer or vehicle deck.

Most modern trailers and transport vehicles used to transport heavy equipment have loading ramps affixed on the back end of the load deck or bed. Most of these use hydraulic cylinders to raise and lower the ramp. Additionally, these ramps tend to be segmented to fold, and thereby allow for a longer ramp without as much height when transporting or storing the trailer. Since the loading ramp must both pivot adjacent the load deck or bed (to pivot up when not in use) and at some intermediate point along the loading ramp (to fold), commonly there are several actuators required, one for each ramp section. As a result, these prior art loading ramps tend to be undesirably complicated, both in construction and in operation. In turn, these same loading ramps are less reliable and require greater operator skill than desired.

Trailers and loading ramps that are configured to carry heavy machinery will also desirably be relatively low to the ground, so that the machinery does not have to be raised as much, thereby also shortening the overall length of the ramp required. However, there is a limited amount of space to work with below a low trailer bed while still maintaining adequate ground clearance. Consequently, many artisans have in the past driven the trailer tip using an actuator such as a hydraulic cylinder that is directly coupled on one end to a pivot anchored into the main ramp and on the other end to a pivot anchored into the ramp tip. The ramp tip will preferably pivot from a stowed position parallel to and next to the main ramp section through an approximate 180 degree arc to a loading and unloading position where the ramp tip is in line with and extends from the main ramp section. This full half-circle rotation means that when the ramp tip is fully extended to the loading and unloading position, the actuator is applying forces in line with pivot point. This means that the forces from the actuator are not primarily lifting the ramp tip into a rotation stop, and instead are almost entirely pushing the ramp tip away from the main ramp section. As may be appreciated, this means that a fully extended ramp tip has essentially no force keeping it locked in a fully extended position.

As a consequence, the fully extended tip of the loading ramp farthest from the load deck or bed tends to shift or rotate undesirably, creating a sensation of flimsiness or instability of the load ramp. Further, when these prior art loading ramps are lowered onto asphalt, cement, earthen surfaces, and the like, instability of the fully extended ramp tip leads to undesirable shifting of the tip of the loading ramp in contact with the surface. This shift, in combination with the weight of the ramps, trailer, and any additional machinery carried upon the trailer, creates extreme forces between the ramp tip and the surface, thereby causing the ramp tip to rip into or otherwise mar the surface. This problem is particularly visible and vexing when the surface is brand new. Both the apparent flimsiness and the shifting against the underlying surface are clearly undesirable.

To overcome this problem of instability in the trailer tip, some artisans have moved the coupling point where the actuator cylinder engages with the ramp tip lower, below the trailer tip pivot point, such as illustrated for exemplary purposes in U.S. Pat. No. 4,647,270 by Maloney, entitled "Transporting unit for trucks and the like," the teachings and contents which are incorporated herein by reference. This patent describes hinge pins 23 between a fixed main ramp and beavertail section 14 and pivotal ramp tip section 22, and a hydraulic actuator 26 coupled to a support 24 extending well below pivot 23 when ramp tip 22 is fully deployed, all visible in FIG. 1 therein. Unfortunately, this means that support 24 will always drop down below pivot 23, and the amount that it extends down is entirely disadvantageous. While some surfaces are level, not all are. Many times, a trailer will be deployed adjacent a slope, such as from an elevated street onto an downward sloping roadway or driveway. In that case, or when the surface is generally uneven, there is a significant and very undesirable chance that the support 24 will engage in the surface before ramp tip 22 is fully deployed. This might not only lead to harm to the surface where support 24 contacts too early, but may further lead to damage to either the support, ramp, or machinery during loading or unloading, if the ramp tip 22 does not fully and completely engage with the surface of the ground.

Another solution that has been proposed is to incorporate a roughly "U"-shaped coupler between the main ramp section and ramp tip, and couple the actuator intermediate along the "U"-shaped coupler. An exemplary US patent, the teachings and content which are incorporated herein by reference, is 7,547,178 by Dierks et al, entitled "Hydraulic tail trailer". A very notable benefit of this approach is that the actuator will always provide a positive force to keep the ramp tip extended. Unfortunately, the greater the "U"-shape, which is the very feature that ensures this continuous force, the more the "U"-shaped coupler extends below the ramp bottom, creating the same drawback noted in the Maloney patent herein above. Furthermore, when the ramp tip is fully extended, the actuator is not only applying a closing rotational force, but also pushing the tip linearly away from the main ramp section in a counter-acting manner Due to the competing forces, the actuator and pivots must all be more powerful than needed to keep the ramp tip secured in the extended position.

Other exemplary U.S. patents, the teachings which are incorporated herein by reference, include: U.S. Pat. No. 2,721,758 by Allen, entitled "Collapsible tail-gate ramp for trucks"; U.S. Pat. No. 2,727,781 by D'Eath, entitled "Tail gate ramp"; U.S. Pat. No. 3,580,404 by Moser, entitled "Loading ramps for trailers"; U.S. Pat. No. 3,642,156 by Stenson, entitled "Pickup truck loading ramp"; U.S. Pat. No. 5,215,426 by Bills, entitled "Trailer including a hinged ramp tail"; U.S. Pat. No. 6,386,819 by Schultz, entitled "Self-powered elevationally adjustable foldable ramp for draft vehicles"; U.S. Pat. No. 6,394,734 by Landoll et al, entitled "Trailer having actuatable tail ramp"; U.S. Pat. No. 8,132,998 by Paproski, entitled "Trailer ramp system"; U.S. Pat. No. 9,315,138 by Dierks et al, entitled "Hydraulic tail trailer"; and U.S. Pat. No. 9,656,588 by Roberts, entitled "Trailer apparatuses having traverse hydraulic tail".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a folding trailer ramp with powered full extension and soft ground contact that carries massive loads while avoiding surface marring.

SUMMARY OF THE INVENTION

In a first manifestation, the invention is, in combination, a transport vehicle and a folding trailer ramp with powered full extension and soft ground contact. The transport vehicle comprises a wheel set; a load supporting bed carried upon the wheel set; a tail; and a prime mover. The folding trailer ramp comprises a quadrilateral linkage having as a first link a rigid tail engagement secured to the tail, as a second link a main ramp segment having a main ramp bed configured to support a load while loading and unloading the load from the load supporting bed, as a third link a push rod, and as a fourth link a first portion of a pivot arm. A ramp tip has a load carrying face configured to support the load while loading and unloading the load from the load supporting bed, and a ground-engaging surface. The ramp tip is rotationally coupled to the main ramp segment. The pivot arm has a second portion configured to transmit force to the ramp tip and thereby control rotation of the ramp tip about the main ramp segment. The prime mover is configured to rotate the main ramp segment relative to the rigid tail engagement between an elevated storage position and a lowered operative position. Responsive to the prime mover rotating the main ramp segment, the quadrilateral linkage is configured to rotate the pivot arm and thereby cause the pivot arm second portion to rotate the ramp tip about the main ramp segment between a first operative position with the ramp tip load carrying face coplanar with the main ramp bed and a second non-coplanar storage position.

In a second manifestation, the invention is a folding trailer ramp with powered full extension and soft ground contact. A rigid tail engagement is configured to secure the folding trailer ramp to a supporting apparatus. A main ramp segment has a main ramp bed configured to support a load while loading and unloading the load from the supporting apparatus. The main ramp segment also defines a longitudinal axis along which the load travels during loading and unloading. A main ramp segment first end is rotationally coupled to the rigid tail engagement about a first horizontal axis of rotation that is transverse to the main ramp bed. A main ramp segment second end is distal from the main ramp segment first end. A push rod has a push rod first end rotationally coupled to the rigid tail engagement about a second horizontal axis of rotation that is transverse to the main ramp bed and lower and more rearward than the first horizontal axis of rotation. A push rod second end is located distal from the push rod first end. A pivot arm has a pivot arm first end rotationally coupled to the main ramp segment second end about a third horizontal axis of rotation that is transverse to the main ramp bed, a pivot arm second end, and a pivot arm push rod pivotal coupling intermediate between the pivot arm first end and the pivot arm second end. The pivot arm push rod pivotal coupling rotationally couples the pivot arm to the push rod second end about a fourth horizontal axis of rotation that is transverse to the main ramp bed. The rigid tail engagement between the first horizontal axis of rotation and the second horizontal axis of rotation defines a first quadrilateral linkage link, the main ramp segment between the first horizontal axis of rotation and the third horizontal axis of rotation defines a second quadrilateral linkage link, the push rod between the second horizontal axis of rotation and the fourth horizontal axis of rotation defines a third quadrilateral linkage link, and the pivot arm between the third horizontal axis of rotation and the fourth horizontal axis of rotation defines a fourth quadrilateral linkage link A ramp tip has a load carrying face configured to support the load while loading and unloading the load from the supporting apparatus, a ground-engaging surface, a ramp tip first end rotationally coupled to the main ramp segment second end about a fifth horizontal axis of rotation that is transverse to the main ramp bed, and a ramp tip second end distal from the ramp tip first end. The pivot arm second end is configured to transmit force to the ramp tip between the ramp tip first and second ends and thereby control rotation of the ramp tip about the fifth horizontal axis. A prime mover is configured to rotate the main ramp segment about the first horizontal axis of rotation relative to the rigid tail engagement. Responsive to the prime mover rotating the main ramp segment, the quadrilateral linkage is configured to rotate the pivot arm about the third horizontal axis of rotation and thereby cause the pivot arm second end to rotate the ramp tip about the fifth horizontal axis.

Objects of the Invention

Exemplary embodiments of the present invention solve inadequacies of the prior art by providing a single actuator assembly that rotates both the main ramp section and the ramp tip, helping to ensure that the loading ramp is both easy and intuitive to operate. A quadrilateral linkage and a roller coupler driven by the quadrilateral linkage combine to fully extend the trailer ramp tip before touching down onto the ground, thereby avoiding surface marring. Additionally, and again owing to the linkage geometry, the ramp tip locks into a stable position when fully extended and so has a much stiffer and more secure feel and appearance than found in the prior art.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a folding trailer ramp with powered full extension and soft ground contact that can be safely and successfully used with heavy machinery. A second object of the invention is for the folding trailer ramp to have a low profile that facilitates a low transport height where so desired. Another object of the present invention is for the folding trailer ramp to be intuitively operable by a single person, using a single control, in a substantially fail-safe manner A further object of the invention is to lock the ramp extension in a stable and fully extended position prior to ground contact, to reduce or avoid surface marring. As a corollary thereto, it is an object of the invention to enable intuitive adjustment of the locking height where necessary to accommodate uneven or irregular surfaces or otherwise different deployment heights. Yet another object of the present invention is to rotate the ramp tip about a pivot using forces that are purely rotational, and that do not include linear components that either drive the ramp tip away from or toward the main ramp section. As a corollary thereto, the powered full extension is most preferably accomplished with application of minimal unnecessary or detrimental forces.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 7-9 illustrate the preferred embodiment folding trailer ramp of FIGS. 1-5 from a side elevational and sectional view from an angle similar to that of FIG. 1. FIGS. 7 and 9 are taken along section line 7' of FIG. 2, while FIG. 8 is taken along section line 8' of FIG. 2. Each Figure illustrates the preferred embodiment folding trailer ramp at different stages of deployment, with FIG. 7 illustrating the ramp in a transport or storage position with the ramp folded, FIG. 8 illustrating the ramp in an intermediate position between storage and deployment position resembling the position of FIG. 1, and with FIG. 9 illustrating the ramp tip in a fully deployed position relative to the ramp, and the ramp almost fully deployed.

DESCRIPTION OF THE PREFERRED EMBODIMENT

Manifested in the preferred embodiment of the invention illustrated in FIGS. 1-5, the present invention provides a folding trailer ramp 1 with powered full extension and soft ground contact that is comprised of a tail 10, at least one main ramp segment 20 and at least one ramp tip 30. While FIGS. 2-6 illustrate two main ramp segments 20 and two ramp tips 30, it will be understood that one or more ramps may be provided to meet the needs of any particular application without departing from the spirit of the present invention.

Trailer tail 10 is illustrated for exemplary and non-limiting purpose, and may as illustrated include a trailer bed 12 which begins the downward slope of the ramp. Trailer tail resembles the common beavertail or dovetail found on commercial trailers, and so in at least some embodiments may be an integral or even unitary part of the trailer. In such embodiments, it would not be included as a part of the preferred embodiment folding trailer ramp 1. As may be appreciated then, it will be understood herein that other apparatus may be substituted for trailer tail 10 in various alternative embodiments, again for exemplary and non-limiting purposes including such apparatus as the end of a flat bed truck or other transport or hauling vehicles, trailers, loading docks, and other apparatus to which main ramp segment 20 and other components in accord with the present invention may be affixed.

In preferred embodiment folding trailer ramp 1, main ramp pivot 23 includes a rigid tail engagement that is affixed to trailer tail 10 and joins trailer bed 12 to main ramp bed 22. Main ramp segment 20 comprises main ramp bed 22 with main ramp pivot 23 at one end which connects to trailer bed 12. At the other end, main ramp segment 20 connects to ramp tip 30 via ramp tip pivot 33. Ramp tip 30 has a ramp tip pivot 33 at one end which connects to main ramp bed 22, and a wedge 34 at the other end.

Main ramp segment 20 and ramp tip 30 are actuated relative to tail 10 by the use of air bags 14. A first end of the generally "H"-shaped push arm assembly 16 is coupled to an end of air bags 14. While the generally "H"-shaped geometry of push arm assembly 16 is preferred, those skilled in the art will recognize that there are other mechanical equivalents to the "H"-shaped geometry that are considered to be incorporated herein.

Figure 1:
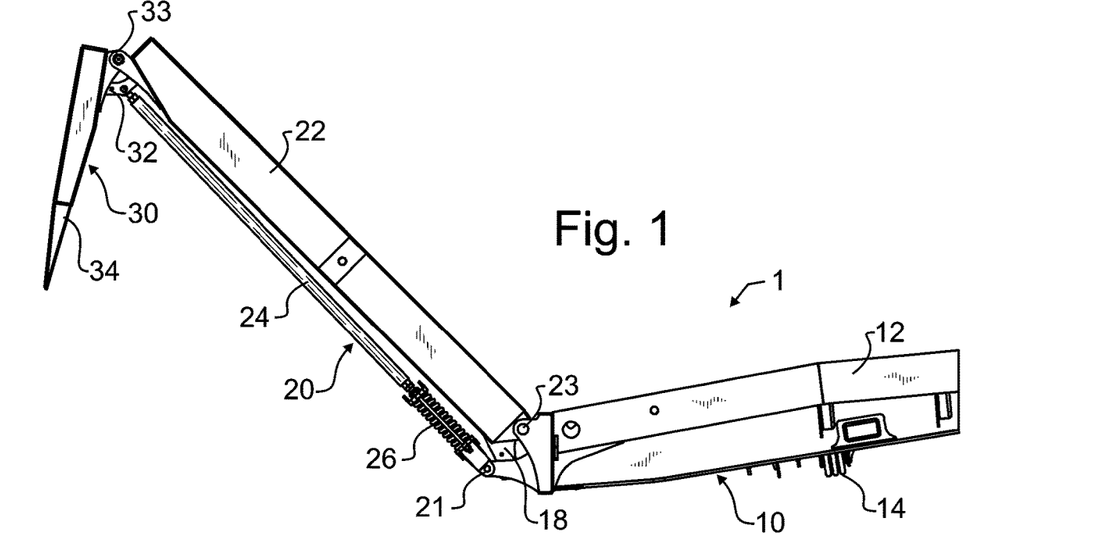
FIGS. 1-5 illustrate a preferred embodiment folding trailer ramp with powered full extension and soft ground contact designed in accord with the teachings of the present invention from side elevational, rear elevational, bottom plan, top plan, and front elevational views, respectively.
Figure 2:
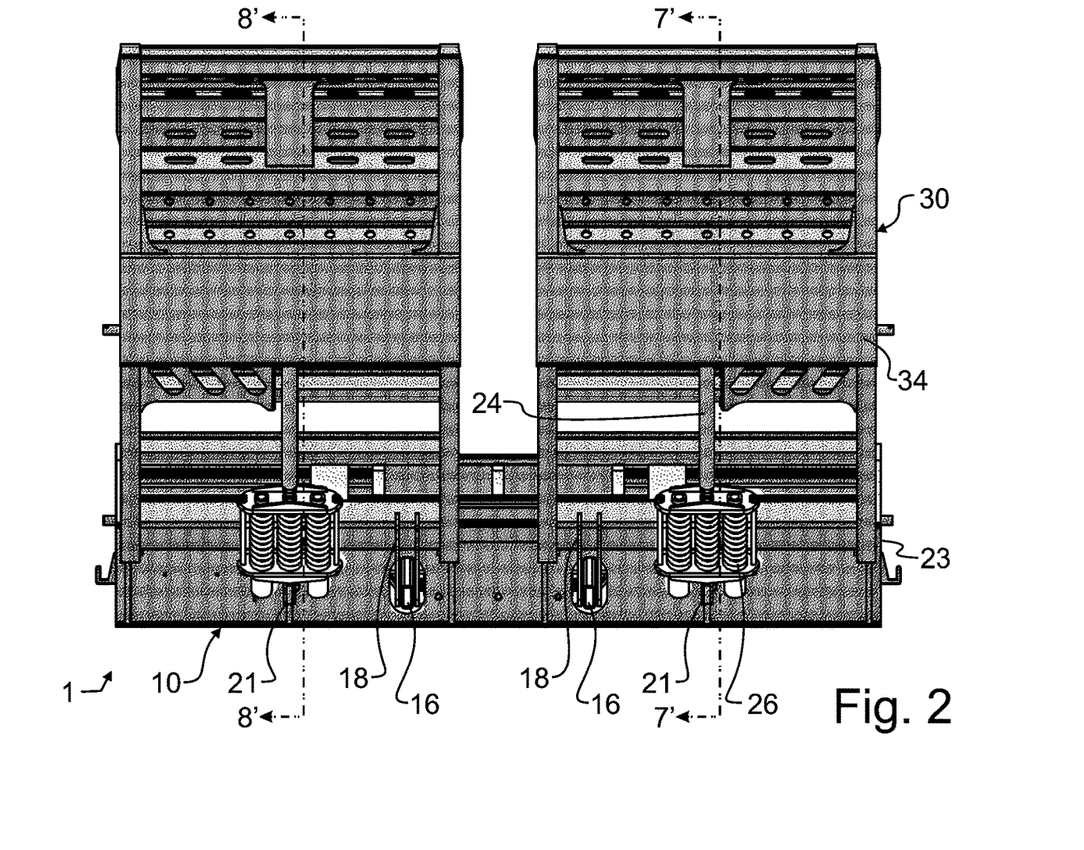
Figure 3:
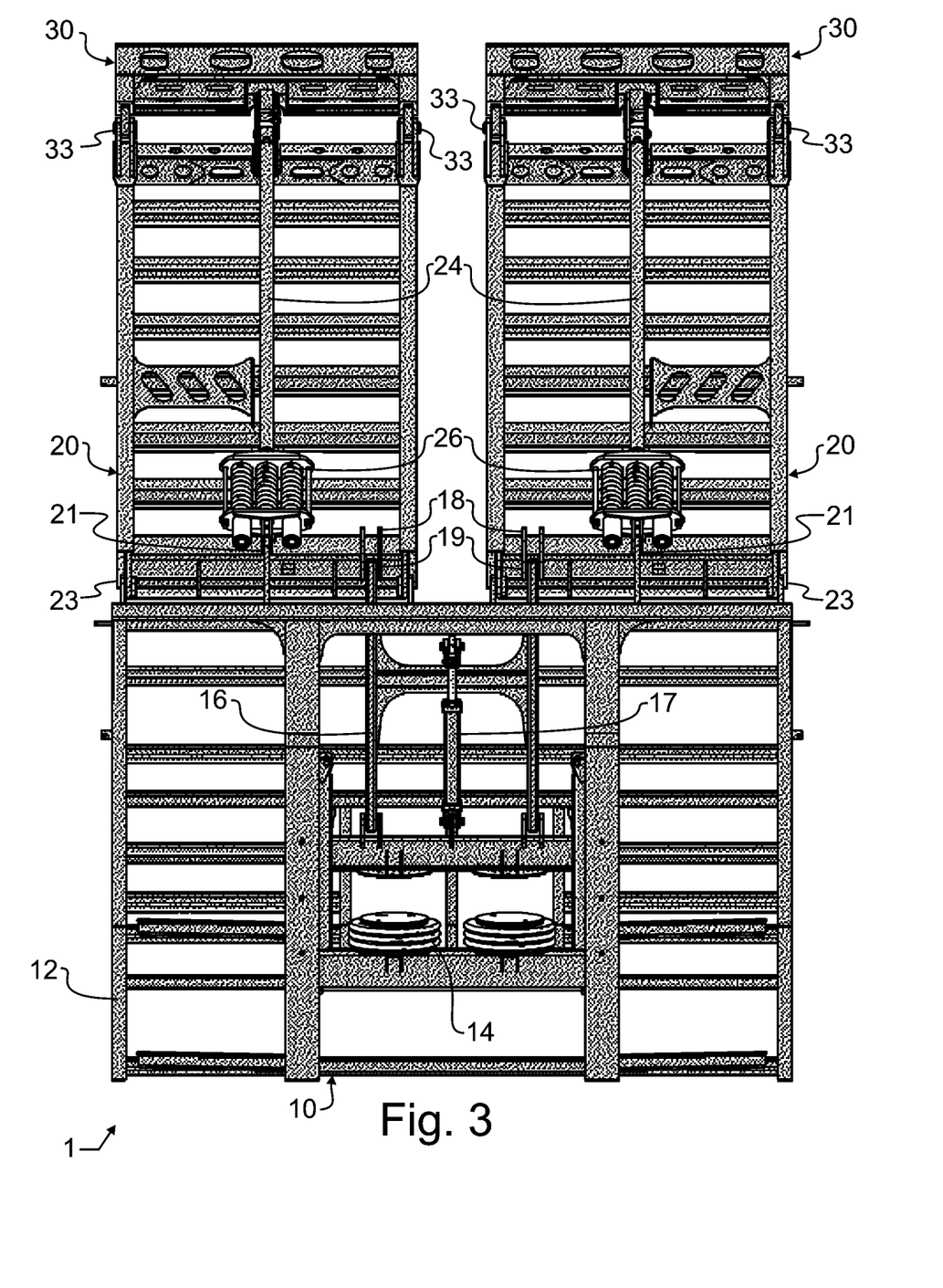
Figure 4:
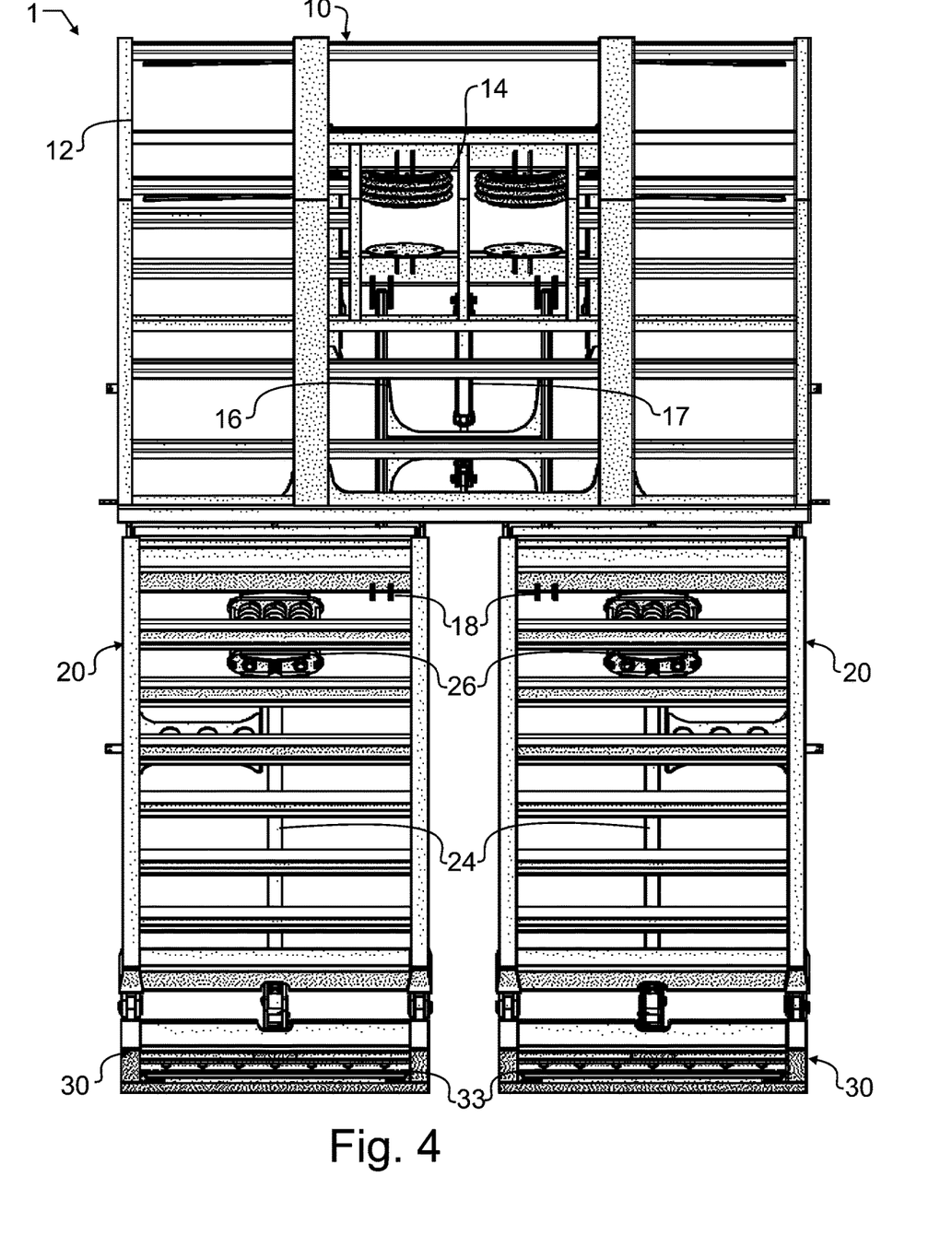
Figure 5:
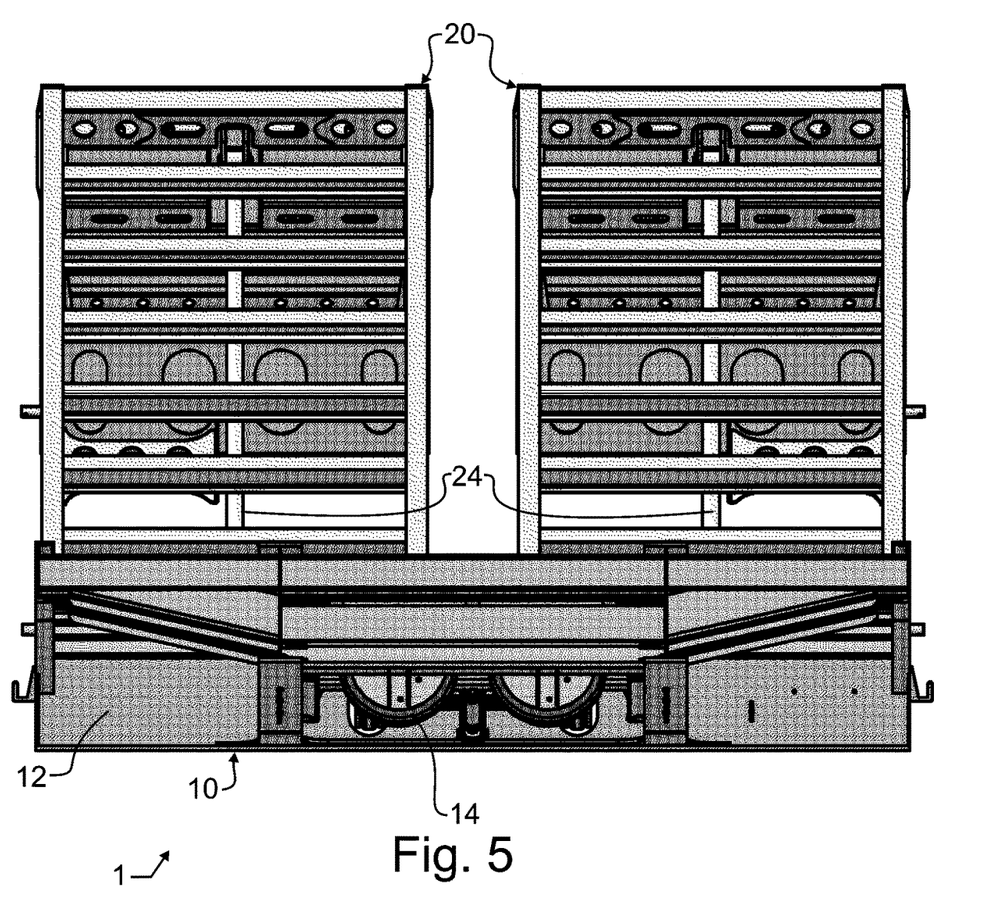
Figure 6:
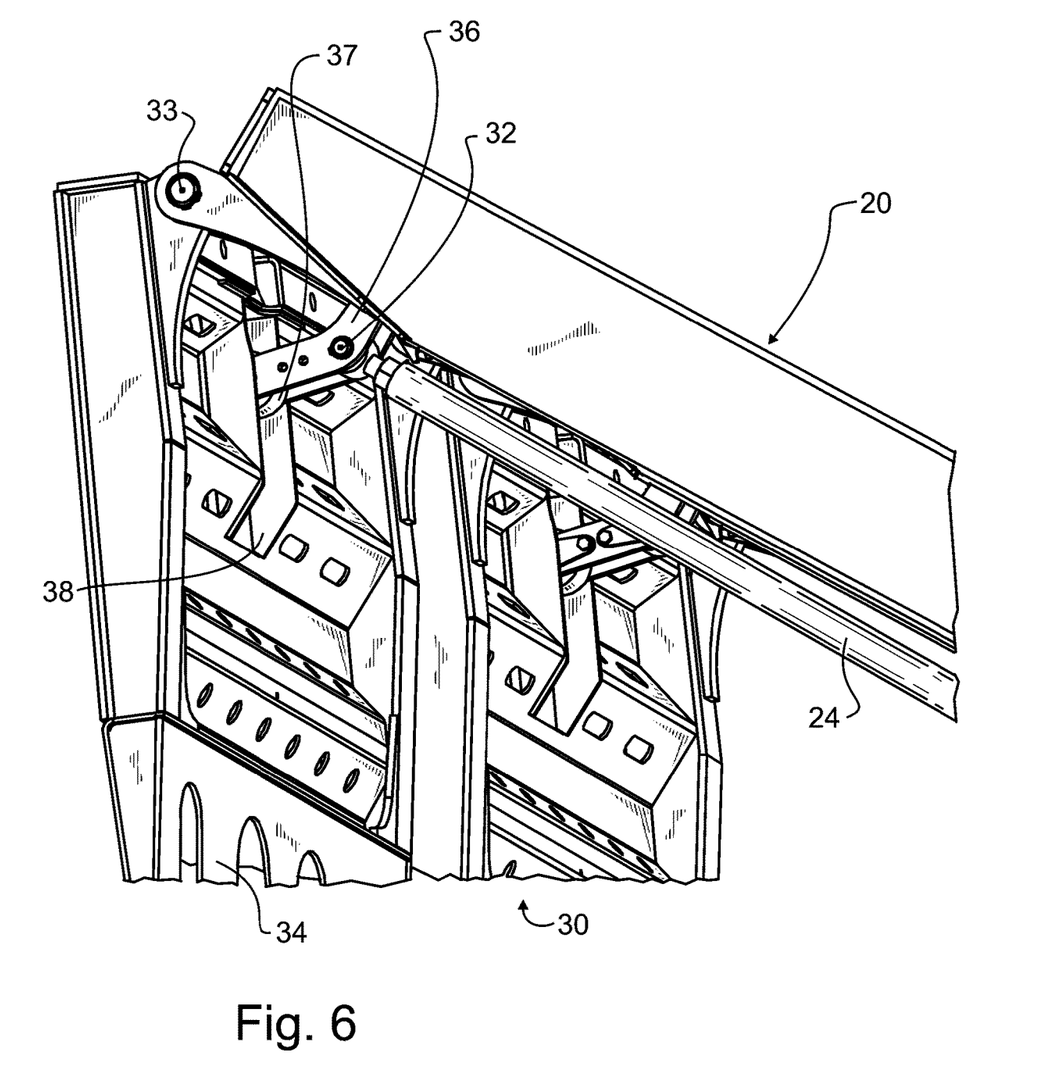
FIG. 6 illustrates the preferred embodiment folding trailer ramp of FIGS. 1-5 from an enlarged partial bottom and forward projected view, showing the pivot arm, anti-friction roller, roller channel, and lower ramp tip geometry in greater detail.
Figure 7:
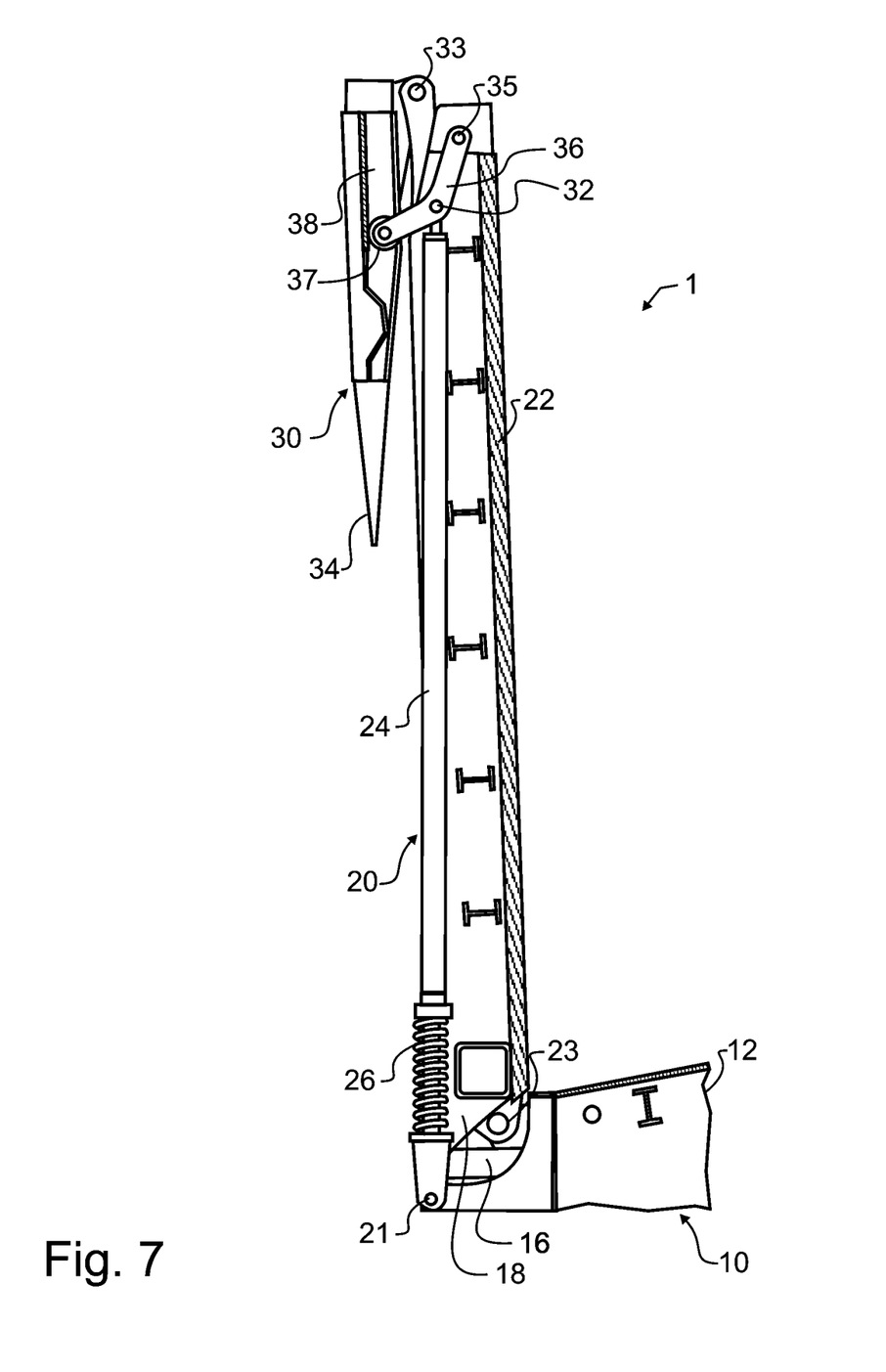
Figure 9:
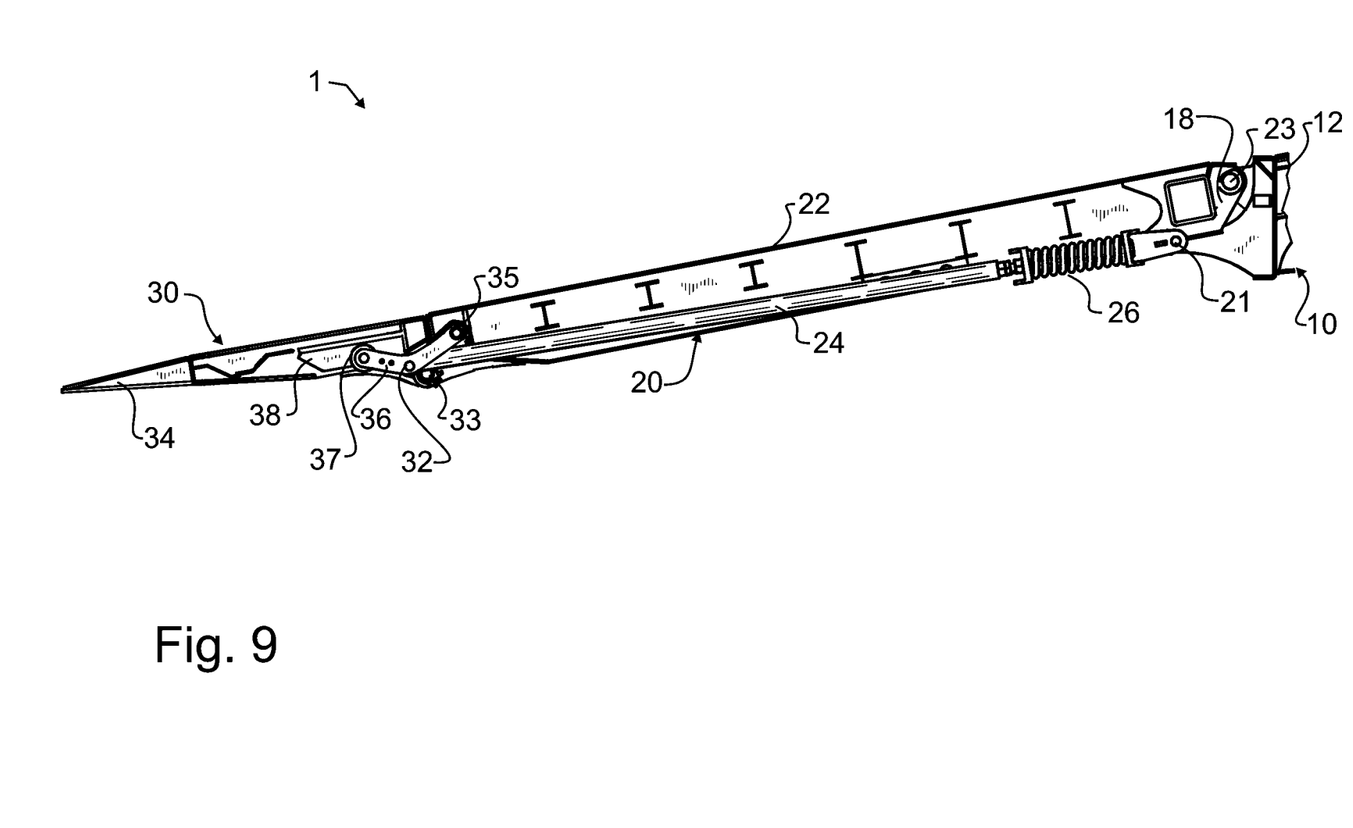

Air bags 14 drive "H"-shaped push arm assembly 16 generally rectilinearly along the longitudinal axis of tail 10. A second end of the generally "H"-shaped push arm assembly 16 is coupled to ramp actuator arm 18 at pintle 19, visible best in FIG. 3. Ramp actuator arm 18 is rigidly affixed to main ramp segment 20, and when moved acts as a lever arm to pivot main ramp segment 20 around main ramp pivot 23. Consequently, when ramp actuator arm 18 is moved forwards and backwards by the expansion and contraction of air bags 14 coupled through "H"-shaped push arm assembly 16, ramp actuator arm 18 acts as a lever that changes the angle of the main ramp segment 20. This action is best observed by comparison of FIGS. 7 and 9. In FIG. 7 "H"-shaped push arm assembly 16 is visible running horizontally in the Figure underneath main ramp pivot 23. At the extreme left edge of "H"-shaped push arm assembly 16, and hidden in FIG. 7 by the lower end of spring assembly 26, is pintle 19 which serves as the juncture between "H"-shaped push arm assembly 16 and ramp actuator arm 18. In FIG. 9, "H"-shaped push arm assembly 16 has been retracted by collapse of air bags 14, and is hidden from view. However, this shift of "H"-shaped push arm assembly 16 to the right in FIG. 9 has consequently rotated ramp actuator arm 18 around main ramp pivot 23, and thereby caused main ramp segment 20 to also rotate more than ninety degrees from the position of FIG. 7.

While in preferred embodiment folding trailer ramp 1, "H"-shaped push arm assembly 16 is driven generally rectilinearly along the longitudinal axis of tail 10, it will be understood herein that in alternative embodiments the travel of "H"-shaped push arm assembly 16 is offset from the longitudinal axis of tail 10, and in further alternative embodiments the travel is not rectilinear. Nevertheless, in all embodiments "H"-shaped push arm assembly 16 or an equivalent thereto is configured to convert the expansion of air bags 14 or an equivalent thereto into rotary motion of main ramp segment 20 around main ramp pivot 23.

This pivoting of main ramp segment 20 around main ramp pivot 23 not only changes the angle of main ramp segment 20 relative to the ground, but also changes the relative angles between each of the quadrilateral linkage components. A first component of the quadrilateral linkage is formed by a line drawn from push rod pivot 21 to main ramp pivot 23. These components are rigidly coupled to each other and to tail 10 by virtue of both being anchored to tail 10. A second component of the quadrilateral linkage is formed by a line drawn from main ramp pivot 23 to pintle 35. These pivots are rigidly coupled to each other by main ramp bed 22. A third component of the quadrilateral linkage is formed by a line drawn from push rod pivot 21 to ramp tip pushing pivot 32. These pivots are coupled to each other by push rod 24 in combination with spring assembly 26, though for reasons that will be explained in greater detail herein below, spring assembly 26 is preferably variable in length. The fourth and final component of the quadrilateral linkage is formed by a line drawn from ramp tip pushing pivot 32 to pintle 35, which is fixed in length since both are secured to pivot arm 36.

As best understood starting with FIG. 7, when main ramp segment 20 is in the substantially vertical transport and storage position, "H"-shaped push arm assembly 16 is fully extended, running horizontally in the Figure underneath main ramp pivot 23 and extending to just above push rod pivot 21. In this position, it will be apparent that the vertical elevation difference between the relatively more elevated and forward main ramp pivot 23 and the much lower and more rearward push rod pivot 21 means that push rod 24 will, at the top of main ramp segment 20, appear to be much shorter than main ramp bed 22. As visible in FIG. 7, ramp tip pushing pivot 32 is also substantially lower than pintle 35.

Figure 8:
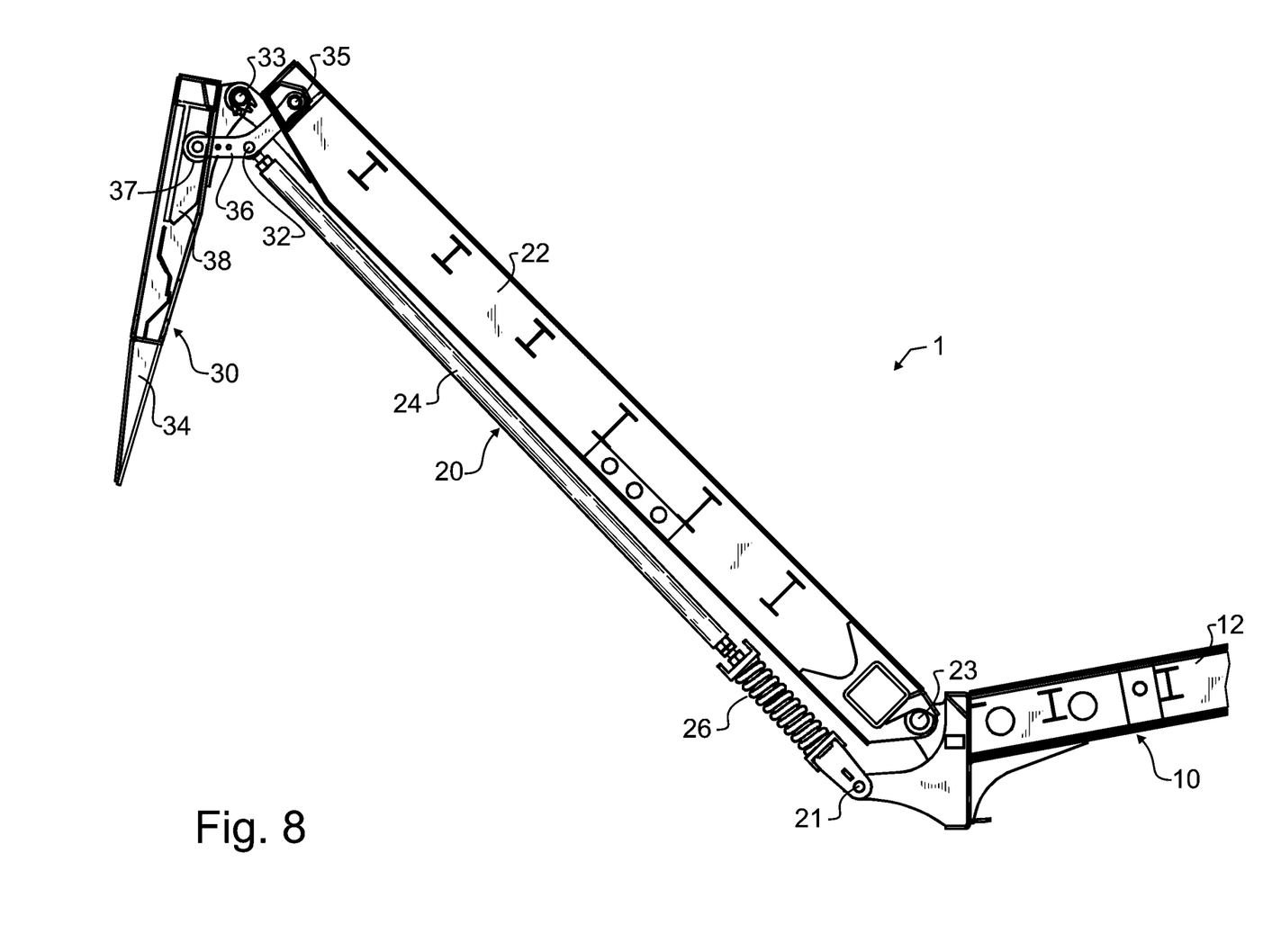

Moving to FIG. 8, a line between main ramp pivot 23 and push rod pivot 21 is approximately normal or perpendicular to main ramp bed 22, meaning that this amount of rotation from FIG. 7 to FIG. 8 is enough that main ramp pivot 23 and push rod pivot 21 are now approximately equidistant from ramp tip pivot 33. In addition, a line between ramp tip pushing pivot 32 and pintle 35 is also approximately normal or perpendicular to main ramp bed 22. This means that pivot arm 36 has been rotated about pintle 35, causing anti-friction roller 37 to push ramp tip 30 from the position of folded and parallel to main ramp segment 20 to angularly offset and partially extended therefrom.

An important features of the present invention is anti-friction roller 37. Since it is a roller that literally rolls within roller channel 38, as much more clearly illustrated with reference to enlarged FIG. 6, any force applied from anti-friction roller 37 into ramp tip 30 is applied normal to the contact surface within roller channel 38. Consequently, in this sequence of movement from FIG. 7 through to FIG. 9, anti-friction roller 37 moves progressively closer to ramp tip pivot 33, all the while applying the force to ramp tip 30 in a direction which substantially entirely generates rotation of ramp tip 30 about ramp tip pivot 33. Anti-friction roller 7 is most preferred, since the roller has reduced friction and wear in the region in contact with roller channel 38. In the event dust, sand, mud, or other abrasive particles collect within roller channel 38, anti-friction roller 37 will, true to the name, roll over these smaller particles and obstacles without generating any sliding or friction there between, thereby avoiding any wear or abrasion. Likewise, anti-friction roller 37 and generally excellent tolerance for smaller or minor objects and obstacles. The roller will simply roll up and over such smaller objects and obstacles, similar to the way a bicycle or automobile tire rolls over twigs, branches, and the like. Nevertheless, in some alternative embodiments other known alternatives will be used, for exemplary and non-limiting purposes including slides or other bearing surfaces that permit relative movement between pivot arm 36 and roller channel 38. Those skilled in the mechanical arts will recognize a myriad of alternatives, each with a unique set of advantages and disadvantages that will be known and used for selection by a designer at design time.

When ramp tip 30 is fully extended and generally parallel to main ramp segment 20, as illustrated in FIG. 9, main ramp pivot 23 is now significantly farther from ramp tip pivot 33 than push rod pivot 21. This has caused pivot arm 36 to rotate further about pintle 35, causing anti-friction roller 37 to continue to push ramp tip 30, now from the position of angularly offset to main ramp segment 20 to parallel and extended therefrom. In this position, ramp tip 30 will most preferably engage main ramp segment 20, for exemplary and non-limiting purpose in the area adjacent to main ramp bed 22, thereby preventing any further rotation of ramp tip 30 about ramp tip pivot 33. In addition, the now generally upper surface of main ramp bed 22 that carries the load, for exemplary and non-limiting purposes such as heavy machinery, is desirably co-planar with the generally upper surface of ramp tip 30 that will likewise carry the load.

The force applied from anti-friction roller 37 to move and maintain ramp tip 30 extended is in a direction which substantially entirely generates rotation of ramp tip 30 about ramp tip pivot 33. No components of this force applied from anti-friction roller 37 to ramp tip 30 are directed otherwise, since such forces would simply rotate anti-friction roller 37. This means that substantially the entire force applied from anti-friction roller 37 to ramp tip 30 is being used for the intended rotation.

This engagement of ramp tip 30 with main ramp segment 20 in the area adjacent to main ramp bed 22 will most preferably occur prior to wedge 34 contacting the ground, as will be explained in greater detail herein below. However, without any flex or compression in the quadrilateral linkage, further rotation of main ramp segment 20 about main ramp pivot 23 in this same counter-clockwise direction as illustrated by the sequence of FIGS. 7-9, brought about by further retraction of "H"-shaped push arm assembly 16, would destroy one of the quadrilateral components. Nevertheless, further rotation is in fact required, if the engagement of ramp tip 30 with main ramp segment 20 in the area adjacent to main ramp bed 22 occurs prior to contact with the ground. In other words, preferred embodiment folding trailer ramp 1 must rotate further in order for wedge 34 to touch down.

To allow further counterclockwise rotation beyond that illustrated in FIG. 9, which in turn enables touchdown onto a ground surface, and to prevent damage due to further rotation subsequent to full extension of ramp tip 30, spring assembly 26 is provided and configured to first hold rigid during the pivoting of ramp tip 30 from the position of FIG. 7 to the position of FIG. 9, and subsequent thereto compress and thereby absorb the needed distance to allow main ramp segment 20 to continue to drop. The timing of the compression of spring assembly 26, the timing of full extension of ramp tip 30, and the extent of forces upon ramp tip 30 and spring assembly 26 each will be selected at design time by one reasonably skilled in the art in light of the present disclosure to satisfy the requirements of a particular geometry, weight, materials selection, and intended application for a particular ramp.

Consequently, and as now may be fully appreciated, this third component of the quadrilateral linkage formed by a line drawn from push rod pivot 21 to ramp tip pushing pivot 32, which includes push rod 24 in combination with spring assembly 26, is variable in length. The length of push rod 24 in combination with spring assembly 26 will depend upon the combination of: the adjustment of the preset or unloaded length of each of push rod 24 and spring assembly 26; and the rotational position of main ramp segment 20 around main ramp pivot 23. As preferred embodiment folding trailer ramp 1 is rotated beyond that of FIG. 9, in order for wedge 34 to touch down, spring assembly 26 will be compressed and thereby loaded with a predictable compression force. This compression force is desirably sufficiently low to prevent any mechanical damage within folding trailer ramp 1, but great enough to further lock ramp tip 30 in the fully extended position.

The lowering of preferred embodiment folding trailer ramp 1, and thus the loading and compression of spring assembly 26, is achieved entirely by the force of gravity acting upon the mass of preferred embodiment folding trailer ramp 1. Since the release of air within air bags 14 may be controlled, meaning air bags 14 will continue to provide decreasing force over time, and since the loading and compression of spring assembly 26 requires additional force, the two combine to provide a slow, easily controlled, and relatively soft ground contact.

In the position illustrated in FIG. 9, any load upon ramp tip 30 that would cause wedge 34 to rotate about pivot 33, including the weight of ramp tip 30, must first compress spring assembly 26 prior to any rotation about ramp tip pivot 33 occurring. Most preferably, when spring assembly 26 is compressed, this compression builds an even greater and very substantial force required to cause ramp tip 30 to drop out of alignment with main ramp segment 20. Consequently, ramp tip 30 does not need to touch ground prior to a load such as machinery wheels being applied to ramp tip 30. Instead, as the machinery wheel climbs ramp tip 30, spring assembly 26 compresses and ramp tip 30 is pressed down onto ground due to the extra load on preferred embodiment folding ramp 1. As a result, preferred embodiment folding ramp 1 has additional inherent tolerance for uneven terrain, including concave or convex loading and unloading surfaces.

Since most preferably the compression upon spring assembly 26 is far greater than any force generated by the weight of ramp tip 30, ramp tip 30 is effectively locked in position, and even tire bounces and the like that may occur when a heavy machine is being loaded will not cause rotation of ramp tip 30 about ramp tip pivot 33. This is critical to greatly reduce harm to a surface when ramp 1 is deployed, during loading of machinery, or during retraction, since when the trailer tires bounce, the bottom flat surface of wedge 34 will remain in contact with the ground, and there is no time or opportunity for the tip of wedge 34 to rotate sufficiently to dig in to the underlying surface. It should be understood that even slight angular change between ramp tip 30 and main ramp segment 20 can be sufficient to cause undesirable scraping and marring. In operation, a retraction of air bags 14 and the associated retraction of "H"-shaped push arm assembly 16 will through the quadrilateral linkage including spring assembly 26, pivot arm 36, and anti-friction roller 37 generate this substantial locking force.

When air bags 14 are inflated from when preferred embodiment folding trailer ramp 1 is in ground contact, movement will be from a position just beyond FIG. 9 to that illustrated in FIG. 9, then to FIG. 8, and finally to that illustrated in FIG. 7. Thus, as main ramp segment 20 is rotated about main ramp pivot 23 into an upward position, ramp tip 30 is allowed to fold into a retracted position that ultimately runs generally perpendicular to the ground and generally parallel to main ramp segment 20. As noted herein above, the orientation of main ramp segment 20 relative to trailer bed 12 is determined not only be the selection of the length of the various components of preferred embodiment folding trailer ramp 1, but also by any adjustments made thereto to suit a need or application.

In some embodiments of the present invention, the overall length of push rod 24 between push rod pivot 21 and ramp tip pushing pivot 32 is adjustable. For exemplary and non-limiting purpose, the length of push rod 24 in some embodiments is adjusted using nuts 25 rotating about a threaded rod as is known in the mechanical arts, including but not limited to turn-buckles and the like. Adjustment of the length of push rod 24 determines the degree of rotation from vertical toward horizontal that triggers the flip or straightening of ramp tip 30, and will also set the angle of main ramp segment 20 when in the storage and transport position. For exemplary and non-limiting purpose, adjustment such as nuts 25 may be used in some embodiments to facilitate adjustment of the length of push rod 24 to deploy ramp tip 30 at desired and potentially different deployment heights, such as to accommodate elevated loading docks, the earth surface, and even depressions in the earth. While nuts 25 are illustrated in the preferred embodiment folding trailer ramp 1, in some alternative embodiments powered rotary actuators are used to rotate the nuts or similar components and thereby through power drive adjust the locking height. In other alternative embodiments, powered linear actuators are provided in replacement of a simple rod to facilitate adjustment of the length of push rod 24.

As may be appreciated, the weight of main ramp segment 20 and ramp tip 30 are generally sufficient to drive air from vents provided and ordinarily associated with air bags 14 and to thereby effect a lowering and deployment of preferred embodiment folding trailer ramp 1 solely through gravitational force. While in some embodiments these air vents may be of fixed cross-sectional area, in other embodiments the cross-sectional area may be controlled in a variable manner through a valve, solenoid, or other apparatus to further control the rate of lowering of preferred embodiment ramp 1. In contrast, retraction of preferred embodiment folding trailer ramp 1 from the loading position just beyond that of FIG. 9 to the transport and storage position of FIG. 7, such as subsequent to loading or unloading, is achieved by inflating air bags 14 in preferred embodiment ramp 1. Consequently, a suitable source of compressed air (not illustrated) will be provided. In other alternative embodiments, other types of suitable prime mover are substituted for air bags 14, including for exemplary and non-limiting purpose electrical actuators and hydraulic actuators.

While weight alone is generally sufficient for deployment of ramp 1, in some embodiments a separate spring arm, shock absorber, or simple cushioning arm 17 is provided that further smooths and cushions movements. In some alternative embodiments, cushioning arm 17 is replaced with a biasing actuator that provides force operative to compress air bags 14. In such embodiments, the biasing actuator may comprise any suitable actuator, and so in some embodiments will be hydraulic, and in other embodiments will be pneumatic, electrical, or of other suitable construction and operation. In yet further alternative embodiments, no component 17 is provided at all.

While not essential to the operation of preferred embodiment ramp 1, roller channel 38 is most preferably provided to reduce pinch points and reduce the likelihood of entanglement with other objects or debris. For exemplary and non-limiting purpose, brush and sticks will extend over roller channel 38, and so will be pushed out of the way by pivot arm 36 during operation. Without roller channel 38, brush, sticks, and other debris might contact anti-friction roller 37 in the vicinity of the contact point of anti-friction roller 37, and can thereby become entangled or otherwise undesirably engaged.

Figure 10:
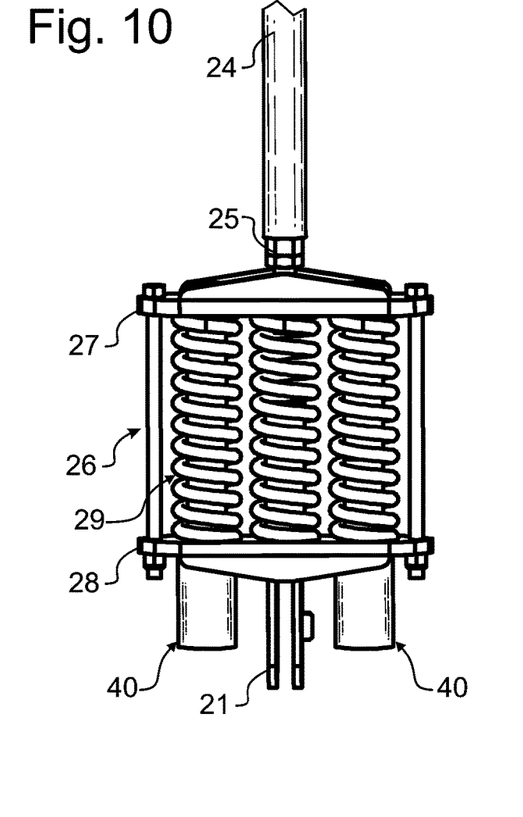
FIGS. 10 and 11 illustrate the preferred spring pack illustrated in FIGS. 1-4 and 7-9 from front elevational and bottom and front projected views, respectively.
Figure 11:
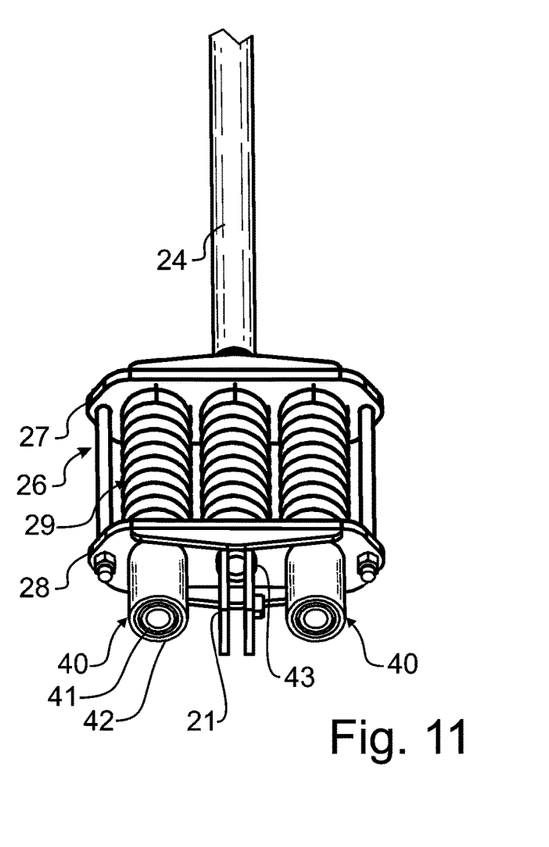

Spring assembly 26 as configured in preferred embodiment ramp 1 and best illustrated in FIGS. 10 and 11 comprises a combination of a spring assembly top plate 27, a spring assembly bottom plate 28, and a plurality of compression springs 29. Spring assembly top plate 27 and spring assembly bottom plate 28 are compressible to bring the two plates 27, 28 closer together when sufficient force is applied to overcome the opposing force generated by compression springs 29. Further, and in accord with the teachings of the present invention, plates 27, 28 are illustrated as coupled with threaded rods parallel to but axially offset from the longitudinal axis of push rod 24, each terminating in nuts. These threaded rods not only hold spring assembly 26 together, but through the tightening of the nuts on each threaded rod, the compression springs 29 are preferably pre-loaded to a user or factory selectable desired compression force.

To keep compression springs 29 in position and alignment with spring assembly top plate 27 and spring assembly bottom plate 28, in preferred embodiment ramp 1 a pair of optional linear bearings 40 are provided. Each linear bearing 40 includes an inner reciprocating pipe 41 that is rigidly affixed with spring assembly top plate 27 and passes inside of and thereby locates the two outer compression springs 29. Each linear bearing 40 also includes an outer fixed pipe 42 that is affixed with spring assembly bottom plate 28 and extends therefrom in a direction away from compression springs 29. Between inner reciprocating pipe 41 and outer fixed pipe 42 there may optionally but preferably be provided an anti-friction device, such as an oiled bushing or other known substance or component. Stub pipe 43 is rigidly affixed to spring assembly bottom plate 28, and serves as a spring guide for the center compression spring 29. In some embodiments including the preferred embodiment, stub pipe 43 also may be configured as a bottom or most compressed hard stop by interfering with spring assembly top plate 27 when compression springs 29 are fully compressed.

While spring assembly 26 greatly facilitates proper rotation and locking of ramp tip 30, to some degree it also reduces the likelihood of overload damage in the event of a jam or obstacle that interferes with movement of the components of ramp 1. Nevertheless, in some embodiments strain or load sensors or the like are provided to detect overload condition and stop operation of air bags 14.

Actuation of preferred embodiment ramp 1 is carried out through the use of a single prime mover assembly that is pneumatically controlled. The use of dual air bags 14 and multiple compression springs 29 in preferred embodiment ramp 1 results in a low profile assembly that facilitates a lower trailer height where so desired. In addition, even if highly unlikely, the dual air bags and multi-spring pack are also preferably designed to provide limited fail-safe protection, wherein with proper design in the event of failure of one of the air bags or one of the springs does not equate to total and catastrophic failure. In accord with the present invention, similar consideration preferably will be made in alternative embodiments using other types of prime movers.

In preferred embodiment folding ramp 1, air bags 14 and push arm assembly 16 are directly connected to ramp actuator arm 18 and thereby directly rotate main ramp segment 20. However, and owing to the presence of the quadrilateral linkage, in alternative embodiments air bags 14 and push arm assembly are directly connected to other parts of the quadrilateral linkage, particularly such as to push rod 24. Irrespective of whether the prime mover air bags 14 and push arm assembly 16 are directly connected to main ramp segment or otherwise to the quadrilateral linkage such as to push rod 24, the prime mover is still also rotating the main ramp segment 20.

As may be apparent from the foregoing disclosure, the preferred and alternative loading ramps designed in accord with the present invention are intuitively operable by a single person, using a single control, while still providing relatively softer and non-marring ground contact.

While a majority of the components are standard components, those skilled in the field may recognize some advantages from using certain materials on some of the components which may not be standard. For exemplary and non-limiting purpose and referencing but one component, ramp wedge 34 may be metal which is powder coated, epoxy coated, or uncoated, but may in some alternative embodiments be comprised of plastic or rubber wear strip. The benefit of using such a material in the wedge is that it can deform as load is transferred on it and thus prevent marring of the surface on which it rests, which in some alternative embodiments may be incorporated to further enhances the effect of preventing damage to a freshly laid asphalt surface.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a transport vehicle and a folding trailer ramp with powered full extension and soft ground contact, said transport vehicle comprising:

a wheel set;
a load supporting bed carried upon said wheel set;
a tail; and
a prime mover;
said folding trailer ramp comprising:
    a quadrilateral linkage having
        as a first link a rigid tail engagement secured to said tail,
        as a second link a main ramp segment having a main ramp bed configured to support a load while loading and unloading said load from said load supporting bed,
        as a third link a push rod, and
        as a fourth link a first portion of a pivot arm;
    a ramp tip having a load carrying face configured to support said load while loading and unloading said load from said load supporting bed, and a ground-engaging surface, said ramp tip rotationally coupled to said main ramp segment;
    said pivot arm having a second portion configured to transmit force to said ramp tip and thereby control rotation of said ramp tip about said main ramp segment;
    wherein said prime mover is configured to rotate said main ramp segment relative to said rigid tail engagement between an elevated storage position and a lowered operative position; and
    wherein responsive to said prime mover rotating said main ramp segment said quadrilateral linkage is configured to rotate said pivot arm and thereby cause said pivot arm second portion to rotate said ramp tip about said main ramp segment between a first operative position with said ramp tip load carrying face coplanar with said main ramp bed and a second non-coplanar storage position; and further comprising
    an anti-friction roller terminating said pivot arm and engaging said ramp tip when said ramp tip is in said first operative position.

2. The combination transport vehicle and folding trailer ramp of claim 1, further comprising a roller channel within said ramp tip partially encompassing said anti-friction roller when said ramp tip is in said first operative position.

3. The combination transport vehicle and folding trailer ramp of claim 1, wherein said main ramp segment further comprises:
    a main ramp segment first end rotationally coupled to said rigid tail engagement about a first horizontal axis of rotation that is transverse to said load supporting bed, and
    a main ramp segment second end distal from said main ramp segment first end;
wherein said push rod further comprises:
    a push rod first end rotationally coupled to said rigid tail engagement about a second horizontal axis of rotation that is transverse to said load supporting bed and lower and more rearward than said first horizontal axis of rotation, and
    a push rod second end distal from said push rod first end; and
wherein said pivot arm further comprises:
    a pivot arm first end rotationally coupled to said main ramp segment second end about a third horizontal axis of rotation that is transverse to said load supporting bed,
    a pivot arm second end, and
    a pivot arm push rod pivotal coupling intermediate between said pivot arm first end and said pivot arm second end and dividing said pivot arm into said pivot arm first and second portions, said pivot arm push rod pivotal coupling rotationally coupling said pivot arm to said push rod second end about a fourth horizontal axis of rotation that is transverse to said load supporting bed.

4. The combination transport vehicle and folding trailer ramp of claim 1, wherein said push rod further comprises a spring assembly, said spring assembly configured to compress subsequent to said ramp tip rotating to said first operative position, wherein said ramp tip is configured to fully extend and subsequently said quadrilateral linkage is configured to move said ramp tip into ground contact.

5. The combination transport vehicle and folding trailer ramp of claim 4, wherein a length of said push rod is adjustable, to thereby adjust an angle of rotation of said main ramp segment about said rigid tail engagement when said ramp tip is fully extended.

6. The combination transport vehicle and folding trailer ramp of claim 1, wherein said prime mover further comprises a pneumatic actuator that is pressurized to rotate said main ramp segment to said elevated storage position, and pressure is released from said pneumatic actuator to rotate said main ramp segment to said lowered operative position.

7. The combination transport vehicle and folding trailer ramp of claim 6, wherein said pressure is released from said pneumatic actuator under a force generated by a weight of said folding trailer ramp.

8. The combination transport vehicle and folding trailer ramp of claim 6, wherein said prime mover further comprises an air bag.

9. The combination transport vehicle and folding trailer ramp of claim 8, wherein said prime mover further comprises at least two air bags operating in a parallel arrangement.

10. A folding trailer ramp with powered full extension and soft ground contact, comprising:
    a rigid tail engagement configured to secure said folding trailer ramp to a supporting apparatus;
    a main ramp segment having
        a main ramp bed configured to support a load while loading and unloading said load from said supporting apparatus and defining a longitudinal axis along which said load travels during said loading and unloading,
        a main ramp segment first end rotationally coupled to said rigid tail engagement about a first horizontal axis of rotation that is transverse to said main ramp bed, and
        a main ramp segment second end distal from said main ramp segment first end;
    a push rod having
        a push rod first end rotationally coupled to said rigid tail engagement about a second horizontal axis of rotation that is transverse to said main ramp bed and lower and more rearward than said first horizontal axis of rotation, and
        a push rod second end distal from said push rod first end;
    a pivot arm having
        a pivot arm first end rotationally coupled to said main ramp segment second end about a third horizontal axis of rotation that is transverse to said main ramp bed,
        a pivot arm second end, and a pivot arm push rod pivotal coupling intermediate between said pivot arm first end and said pivot arm second end, said pivot arm push rod pivotal coupling rotationally coupling said pivot arm to said push rod second end about a fourth horizontal axis of rotation that is transverse to said main ramp bed;

wherein said rigid tail engagement between said first horizontal axis of rotation and said second horizontal axis of rotation defines a first quadrilateral linkage link, said main ramp segment between said first horizontal axis of rotation and said third horizontal axis of rotation defines a second quadrilateral linkage link, said push rod between said second horizontal axis of rotation and said fourth horizontal axis of rotation defines a third quadrilateral linkage link, and said pivot arm between said third horizontal axis of rotation and said fourth horizontal axis of rotation defines a fourth quadrilateral linkage link;

a ramp tip having a load carrying face configured to support said load while loading and unloading said load from said supporting apparatus, a ground-engaging surface, a ramp tip first end rotationally coupled to said main ramp segment second end about a fifth horizontal axis of rotation that is transverse to said main ramp bed, and a ramp tip second end distal from said ramp tip first end;

said pivot arm second end configured to transmit force to said ramp tip between said ramp tip first and second ends and thereby control rotation of said ramp tip about said fifth horizontal axis;

a prime mover configured to rotate said main ramp segment about said first horizontal axis of rotation relative to said rigid tail engagement; and wherein responsive to said prime mover rotating said main ramp segment said quadrilateral linkage is configured to rotate said pivot arm about said third horizontal axis of rotation and thereby cause said pivot arm second end to rotate said ramp tip about said fifth horizontal axis.

11. The folding trailer ramp of claim 10, wherein said prime mover is configured to rotate said main ramp segment relative to said rigid tail engagement between an elevated storage position and a lowered operative position.

12. The folding trailer ramp of claim 11, wherein responsive to said prime mover rotating said main ramp segment said quadrilateral linkage is configured to rotate said pivot arm and thereby cause said pivot arm second portion to rotate said ramp tip about said main ramp segment between a first operative position with said ramp tip load carrying face coplanar with said main ramp bed and a non-coplanar second storage position.

13. The folding trailer ramp of claim 10, further comprising an anti-friction roller terminating said pivot arm second end and engaging said ramp tip.

14. The folding trailer ramp of claim 13, further comprising a roller channel within said ramp tip partially encompassing said anti-friction roller.

15. The folding trailer ramp of claim 12, wherein said push rod further comprises a spring assembly, said spring assembly configured to compress subsequent to said ramp tip rotating to said first operative position, wherein said ramp tip is configured to fully extend and subsequently said quadrilateral linkage is configured to move said ramp tip into ground contact.

16. The folding trailer ramp of claim 15, wherein a length of said push rod is adjustable, to thereby adjust an angle of rotation of said main ramp segment about said rigid tail engagement when said ramp tip is fully extended.

17. The folding trailer ramp of claim 10, wherein said prime mover further comprises a pneumatic actuator that is pressurized to rotate said main ramp segment to said elevated storage position, and pressure is released from said pneumatic actuator to rotate said main ramp segment to said lowered operative position.

18. The folding trailer ramp of claim 17, wherein said pressure is released from said pneumatic actuator under a force generated by a weight of said folding trailer ramp.

19. The folding trailer ramp of claim 18, wherein said prime mover further comprises an air bag.

* * * * *